United States Patent Office 3,455,800
Patented July 15, 1969

3,455,800
PROCESS OF PREPARING 4-DEDIMETHYL-
AMINOTETRACYCLINES
Joseph John Hlavka, Tuxedo, and Panayota Bitha, New York, N.Y., assignors to American Cyanamid Company, Stamford, Conn., a corporation of Maine
No Drawing. Continuation-in-part of application Ser. No. 555,231, June 6, 1966. This application Dec. 1, 1966, Ser. No. 598,234
Int. Cl. B01k 1/00
U.S. Cl. 204—158        10 Claims This application is a continuation-in-part of our copending application Ser. No. 555,231, filed June 6, 1966, and now abandoned.

This invention relates to a novel process for deaminating tetracyclines and, more particularly, is concerned with a photolytic process for transforming tetracyclines to the corresponding 4-dedimethylaminotetracyclines as set forth in the following reaction scheme:

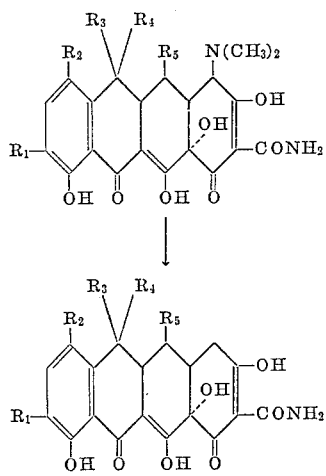

wherein $R_1$ is hydrogen, chloro, nitro, amino or methylamino; $R_2$ is hydrogen, chloro, nitro, amino or dimethylamino; $R_3$ is hydrogen or methyl; $R_4$ is hydrogen or hydroxy; and $R_5$ is hydrogen or hydroxy.

The photolytic conversion of the present invention is preferably effected by dissolving or dispersing the tetracycline starting material in a reaction-inert solvent, i.e., one which is substantially inert to the effect of light under the reaction conditions, and irradiating the solution with light. A minimum of laboratory experimentation will permit the selection of appropriate solvents for the present process. Those suitable include lower alkanols such as methanol, acetonitrile, acetic acid, water, and the like. The concentration of the tetracycline starting material in the solvent is not critical.

The ligh employed in the photolytic process of the present invention is advantageously of a wavelength not less than about 2,500 Angstroms and is preferably of a wave length from about 2,500 to about 4,000 Angstroms. In order to conveniently achieve this, the reaction may be carried out in a vessel constructed of a material such as quartz, which filters out substantially all the light passing through the vessel having a wave length below about 2,500 Angstroms. The light source is conveniently a high pressure mercury arc lamp of about 450 watts. However, if a ketonic sensitizer is dissolved in the solution of tetracycline starting material and solvent, then a light source comprising a high pressure mercury arc lamp of only about 200 watts is necessary.

Suitable ketonic sensitizers which may be so employed correspond to the following general formula:

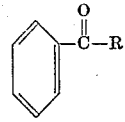

wherein R is hydrogen, lower alkyl, phenyl or naphthyl. The concentration of ketonic sensitizer in the solution of starting material and solvent may be from about 1 to about 50 grams per liter although a concentration of about 5–10 grams per liter is preferred.

The temperature at which the photolysis is carried out is not particularly critical for good yields of product, but is conveniently within the range from 5° C. to 50° C.; for instance, from about 25° C. to about 30° C. The time required for substantial conversion of the tetracycline to the corresponding 4-dedimethylaminotetracycline will naturally vary with reaction conditions, including the light intensity, the temperature, and the presence or absence of a ketonic sensitizer, and is therefore best determined by trial in the individual case. However, a period of time ranging from about 2 to about 8 hours is generally sufficient.

The products of the novel photolytic process of the present invention are biologically active, possessing appreciable activity against a variety of gram positive and gram negative microorganisms, and are also useful as growth stimulants and in veterinary practice; as is more fully set forth in U.S. Patents No. 2,786,077, 3,047,626 and 3,117,159. The 4-dedimethylaminotetracyclines are also useful as intermediates in that they may be oxidized to the corresponding 4-ketotetracyclines with a variety of oxidizing agents such as mercuric acetate and acetic acid, selenium oxide, chromic oxide, etc. The 4-ketotetracyclines may be converted, in turn, to the corresponding 4-dedimethylamino-4-di(lower alkyl)aminotetracyclines by a reductive alkylation process as is more fully set forth in U.S. Patent No. 3,247,226. The starting materials for the novel process of the present invention are well known in the art and require no further elucidation.

After the irradiation step is complete, the product may be obtained by standard procedures. For example, the reaction mixture may be evaporated to dryness and the residue may be dissolved in a minimal amount of solvent such as ethanol or methanol. The resulting solution may be diluted with ether, and the resulting precipitated product may be recovered by filtration. Further purification may then be achieved by standard techniques such as crystallization or chromatography.

The following examples are provided merely for illustrative purposes, and should not be interpreted as limiting the invention, many variations of which are possible within the spirit and scope thereof.

EXAMPLE 1

General procedure for irradiation of tetracycline

A solution of 100 milligrams of a tetracycline (free base) in 10 milliliters of solvent is irradiated for four hours in the presence of acetophenone. The irradiation is carried out in a water-cooled quart vessel using two 100-watt mercury arc lamps. Alternately, the reaction may be carried out without the use of a ketonic sensitizer if a 450-watt mercury arc lamp is used.

EXAMPLE 2

Photolysis of 6-demethyl-7-chlorotetracycline

This photolysis was carried out in methanol using acetophenone as a sensitizer and two 100-watt mercury arc lamps. The product, 4-dedimethylamino-6-demethyl-7-chlorotetracycline, was purified by partition chromatography.

EXAMPLE 3

Photolysis of 6-demethyl-7-chlorotetracyline

The reaction of Example 2 was run without the use of a sensitizer, but using a 450 watt mercury arc lamp.

EXAMPLE 4

Photolysis of 7-chlorotetracycline

The irradiation was carried out in methanol using acetophenone as a sensitizer. The product, 4-dedimethylamino-7-chlorotetracycline, was purified by chromatography.

EXAMPLE 5

Preparation of 4-dedimethylamino-6-demethyltetracycline

This product was prepared as described in Example 2 above, from 6-demethyltetracycline.

EXAMPLE 6

Preparation of 4-dedimethylamino-6-demethyl-6-deoxy-7-dimethylaminotetracycline

This product was prepared as described in Example 2 above, from 6-demethyl-6-deoxy-7-dimethylaminotetracycline.

EXAMPLE 7

Preparation of 7-amino-4-dedimethylamino-6-deoxy-6-demethyltetracycline

This product was prepared as described in Example 2 above, from 7 amino-6-deoxy-6-demethyltetracycline.

EXAMPLE 8

Preparation of 7-nitro-4-dedimethylamino-6-deoxy-6-demethyltetracycline

This product was prepared as described in Example 2 above, from 7-nitro-6-deoxy-6-demethyltetracycline.

What is claimed is:

1. The method of preparing a compound of the formula:

[Structural formula with substituents $R_1$, $R_2$, $R_3$, $R_4$, $R_5$, OH, CONH$_2$]

wherein $R_1$ is selected from the group consisting of hydrogen, chloro, nitro, amino and methylamino, $R_2$ is selected from the group consisting of hydrogen, chloro, nitro, amino and dimethylamino, $R_3$ is selected from the group consisting of hydrogen and methyl, and $R_4$ and $R_5$ are each selected from the group consisting of hydrogen and hydroxy; which comprises irradiating a solution of a compound of the formula:

[Structural formula with substituents $R_1$, $R_2$, $R_3$, $R_4$, $R_5$, N(CH$_3$)$_2$, OH, CONH$_2$]

wherein $R_1$, $R_2$, $R_3$, $R_4$ and $R_5$ are as hereinabove defined, in a reaction-inert solvent with light of a wavelength between about 2,500 Angstroms and 4,000 Angstroms; and continuing said irradiation until the tetracycline is substantially converted to the corresponding 4-dedimethylaminotetracycline.

2. A process according to claim 1 wherein the solution of tetracycline in a reaction-inert solvent contains a ketonic sensitizer dissolved therein; said ketonic sensitizer being a compound of the formula:

[Structural formula: phenyl-C(=O)-R]

wherein R is selected from the group consisting of hydrogen lower alkyl, phenyl and naphthyl.

3. A process according to claim 2 wherein $R_1$, $R_2$ and $R_5$ are hydrogen, $R_3$ is methyl, $R_4$ is hydroxy and R is methyl.

4. A process according to claim 2 wherein $R_2$ is chloro, $R_1$, $R_3$ and $R_5$ are hydrogen, $R_4$ is hydroxy and R is methyl.

5. A process according to claim 2 wherein $R_2$ is chloro, $R_1$ and $R_5$ are hydrogen, $R_3$ is methyl, $R_4$ is hydroxy and R is methyl.

6. A process according to claim 2 wherein $R_2$ is nitro, $R_1$, $R_3$, $R_4$ and $R_5$ are hydrogen and R is methyl.

7. A process according to claim 2 wherein $R_2$ is dimethylamino, $R_1$, $R_3$, $R_4$ and $R_5$ are hydrogen and R is methyl.

8. A process according to claim 1 wherein $R_1$, $R_2$ and $R_5$ are hydrogen, $R_3$ is methyl and $R_4$ is hydroxy.

9. A process according to claim 1 wherein $R_2$ is chloro, $R_1$, $R_3$ and $R_5$ are hydrogen and $R_4$ is hydroxy.

10. A process according to claim 1 wherein $R_2$ is chloro, $R_1$ and $R_5$ are hydrogen, $R_3$ is methyl and $R_4$ is hydroxy.

References Cited

UNITED STATES PATENTS 3,219,671    11/1965    Hlavka _____ 204—158 X

HOWARD S. WILLIAMS, Primary Examiner